(12) United States Patent
Mizuno

(10) Patent No.: US 12,316,522 B2
(45) Date of Patent: May 27, 2025

(54) BUILDING MANAGEMENT SYSTEM

(71) Applicant: Mitsubishi Electric Corporation, Tokyo (JP)

(72) Inventor: Hiromasa Mizuno, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 529 days.

(21) Appl. No.: 17/794,262

(22) PCT Filed: Apr. 3, 2020

(86) PCT No.: PCT/JP2020/015367
§ 371 (c)(1),
(2) Date: Jul. 21, 2022

(87) PCT Pub. No.: WO2021/199438
PCT Pub. Date: Oct. 7, 2021

(65) Prior Publication Data
US 2023/0052248 A1    Feb. 16, 2023

(51) Int. Cl.
*H04L 43/16*     (2022.01)
*H04L 43/0876*   (2022.01)

(52) U.S. Cl.
CPC .......... *H04L 43/16* (2013.01); *H04L 43/0876* (2013.01)

(58) Field of Classification Search
None
See application file for complete search history.

(56) References Cited

U.S. PATENT DOCUMENTS

| | | | |
|---|---|---|---|
| 2015/0088576 A1* | 3/2015 | Steven | G05F 1/66 705/7.22 |
| 2015/0112497 A1* | 4/2015 | Steven | G06F 30/20 700/291 |
| 2015/0142526 A1* | 5/2015 | Forbes, Jr. | G05D 17/00 |

FOREIGN PATENT DOCUMENTS

| | | |
|---|---|---|
| JP | 2015-26420 A | 2/2015 |
| JP | 2015-90228 A | 5/2015 |

OTHER PUBLICATIONS

International Search Report and Written Opinion mailed on Aug. 4, 2020, received for PCT Application PCT/JP2020/015367, filed on Apr. 3, 2020, 8 pages including English Translation.

* cited by examiner

*Primary Examiner* — Phirin Sam
(74) *Attorney, Agent, or Firm* — XSENSUS

(57) ABSTRACT

Providing a building management system capable of preventing total communication traffic between a center apparatus and a communication terminal apparatus from exceeding a set threshold. The building management system includes: circuitry to calculate past communication traffic which is an accumulative value of traffic of communication received from a communication terminal apparatus; to calculate a remaining communication capacity by using information about a set first communication traffic threshold and information about the past communication traffic; and to create, if communication traffic required for transmission of first transmitted information to be transmitted to the communication terminal apparatus is larger than the remaining communication capacity, such second transmitted information that communication traffic required for transmission does not exceed the remaining communication capacity by dividing the first transmitted information, and to transmit the (Continued)

second transmitted information to the communication terminal apparatus.

9 Claims, 5 Drawing Sheets

FIG. 2

| COMMUNICATION TERMINAL APPARATUS | FIRST COMMUNICATION TRAFFIC THRESHOLD | FIRST TRANSMITTED INFORMATION | WHETHER TRANSMISSION IS REQUIRED OR NOT (INFORMATION AMOUNT) | PRIORITY (EXCESS RATE) | APRIL ||| MAY |||
|---|---|---|---|---|---|---|---|---|---|---|
| | | | | | PAST COMMUNICATION TRAFFIC | SECOND COMMUNICATION TRAFFIC THRESHOLD | REMAINING COMMUNICATION CAPACITY | PAST COMMUNICATION TRAFFIC | SECOND COMMUNICATION TRAFFIC THRESHOLD | REMAINING COMMUNICATION CAPACITY |
| 2a | 100 | a | REQUIRED (150) | LOW | 30 | 100 | 70 | 10 | 100 | 90 |
| 2b | 100 | b | REQUIRED (150) | MEDIUM (20%) | 60 | 120 | 60 | 30 | 120 | 90 |
| 2c | 100 | c | REQUIRED (150) | HIGH | 60 | 210 | 150 | 30 | — | — |

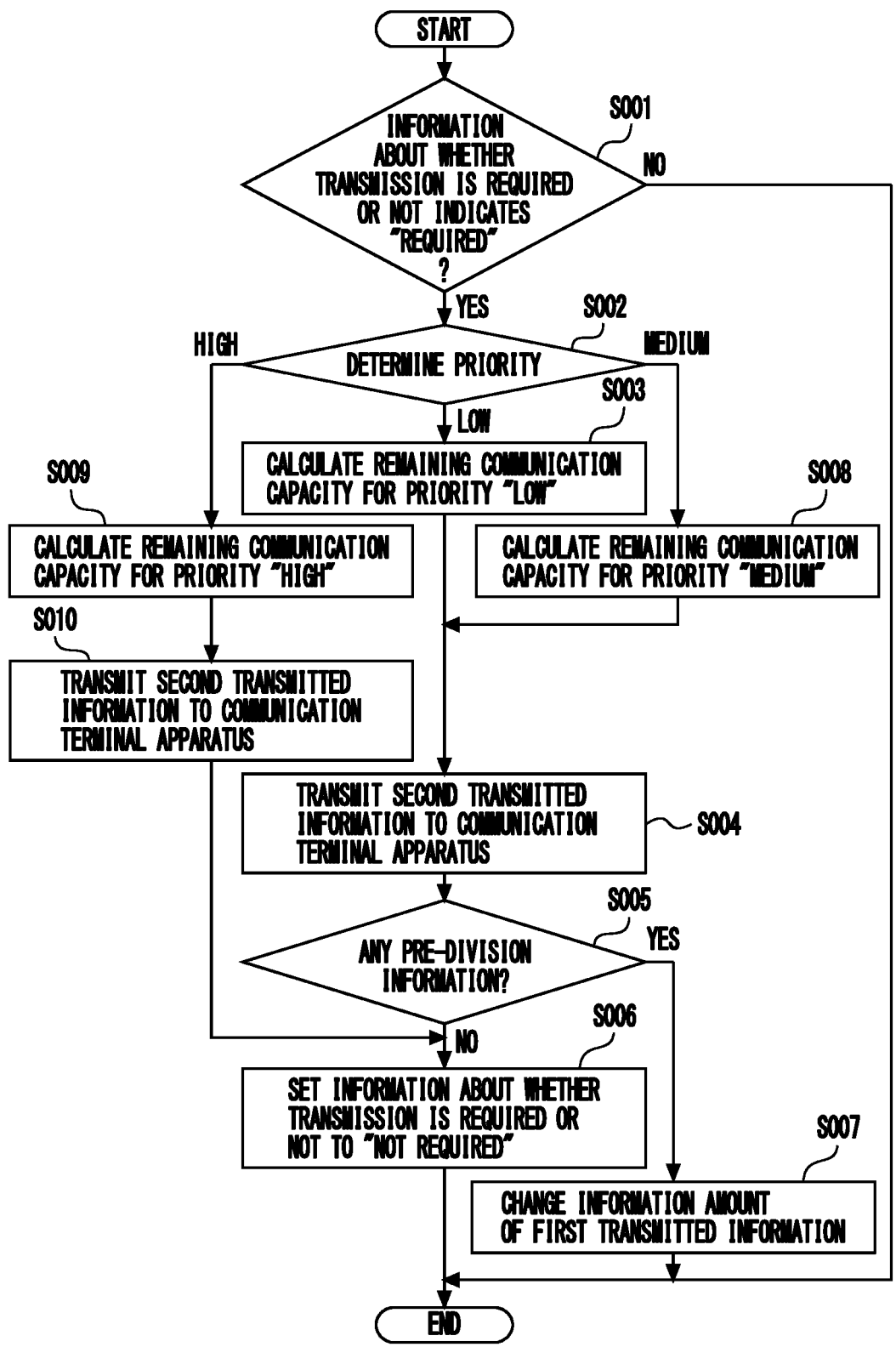

FIG. 4

| COMMUNICATION TERMINAL APPARATUS | FIRST COMMUNICATION TRAFFIC THRESHOLD | WHETHER TRANSMISSION IS REQUIRED OR NOT (INFORMATION AMOUNT) | APRIL | | MAY | | JUNE | |
|---|---|---|---|---|---|---|---|---|
| | | | PAST COMMUNICATION TRAFFIC | REMAINING COMMUNICATION CAPACITY | PAST COMMUNICATION TRAFFIC | REMAINING COMMUNICATION CAPACITY | PAST COMMUNICATION TRAFFIC | REMAINING COMMUNICATION CAPACITY |
| 2d | 100 | REQUIRED (150) | 40 | 60 | 30 | 70 | 10 | 90 |
| 2e | 100 | REQUIRED (150) | 10 | 90 | 20 | 60 | 20 | 0 |

BUILDING MANAGEMENT SYSTEM

CROSS-REFERENCE TO RELATED APPLICATION

The present application is based on PCT filing PCT/JP2020/015367, filed Apr. 3, 2020, the entire contents of which are incorporated herein by reference.

FIELD

The present disclosure relates to a building management system.

BACKGROUND

PTL 1 discloses a building management system. In the building management system, a center apparatus and a communication terminal apparatus are connected via a communication network.

CITATION LIST

Patent Literature

[PTL 1] JP 2015-026420 A

SUMMARY

Technical Problem

The building management system described in PTL 1, however, does not manage information transmitted from the center apparatus to the communication terminal apparatus. As a result, total communication traffic between the center apparatus and the communication terminal apparatus exceeds a set threshold.

The present disclosure has been made to solve the above problem. An object of the present disclosure is to provide a building management system capable of preventing total communication traffic between a center apparatus and a communication terminal apparatus from exceeding a set threshold.

Solution to Problem

A building management system according to the present disclosure includes: a past communication traffic calculation unit calculating past communication traffic which is an accumulative value of traffic of communication received from a communication terminal apparatus provided in a building; a remaining communication capacity calculation unit calculating a remaining communication capacity by using information about a set first communication traffic threshold and information about the past communication traffic; and a communication traffic monitoring unit creating, if communication traffic required for transmission of first transmitted information to be transmitted to the communication terminal apparatus is larger than the remaining communication capacity, such second transmitted information that communication traffic required for transmission does not exceed the remaining communication capacity by dividing the first transmitted information, and transmitting the second transmitted information to the corresponding communication terminal apparatus.

Advantageous Effects of Invention

According to the present disclosure, a building management system creates such second transmitted information that communication traffic required for transmission does not exceed a remaining communication capacity by dividing the first transmitted information, and transmits the second transmitted information to a corresponding communication terminal apparatus. Therefore, it is possible to prevent total communication traffic between a center apparatus and the communication terminal apparatus from exceeding a set threshold.

BRIEF DESCRIPTION OF DRAWINGS

FIG. 2 is a diagram showing an example of division transmission processing of the building management system in the first embodiment.

FIG. 3 is a flowchart of the division transmission processing performed by a center apparatus of the building management system in the first embodiment.

FIG. 4 is a diagram showing a comparative example of the division transmission processing of the building management system in the first embodiment.

DESCRIPTION OF EMBODIMENTS

Figure 1:
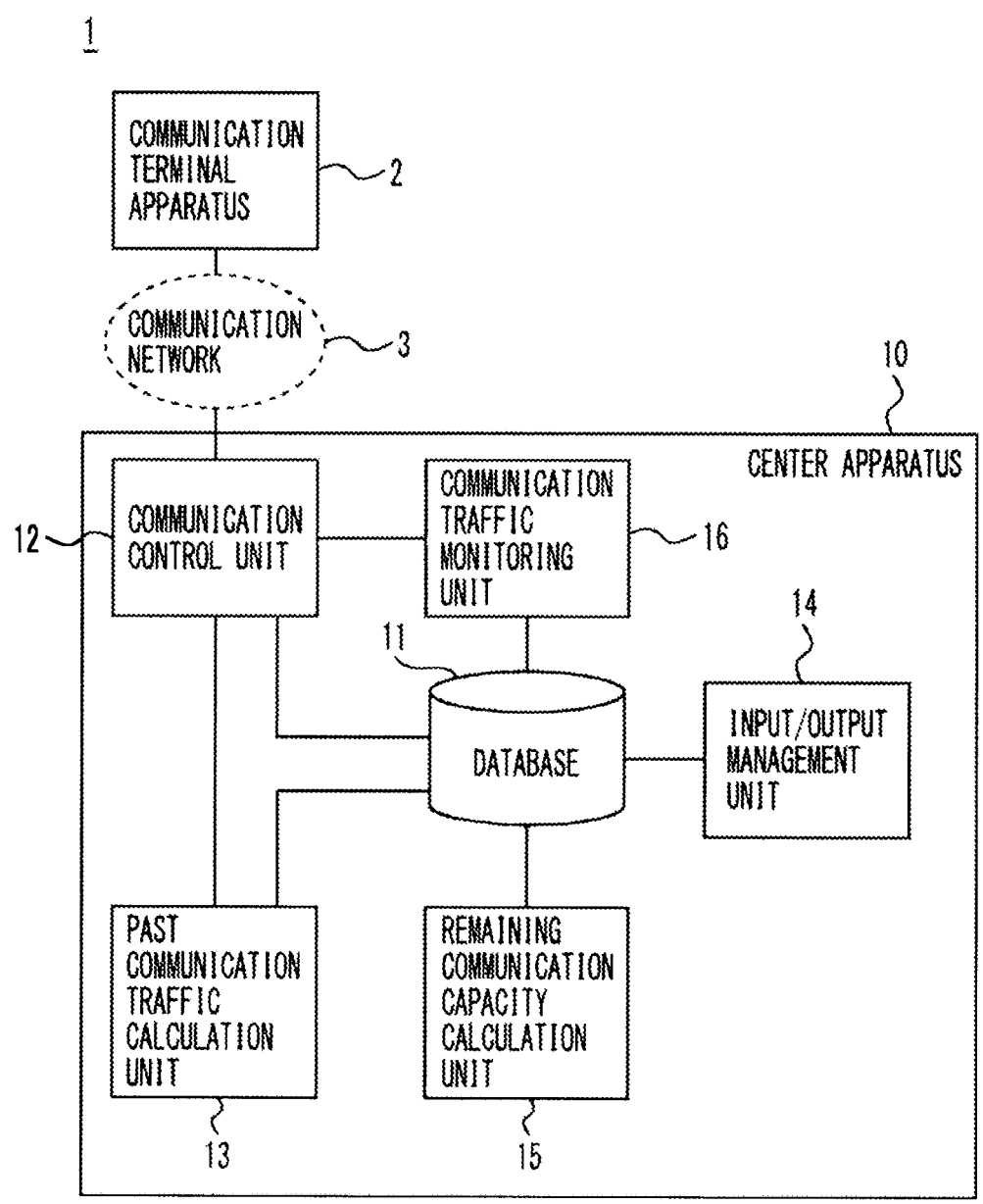
FIG. 1 is a block diagram indicating a building management system in a first embodiment.

An embodiment will be described according to the accompanying drawings. Note that, in the drawings, the same or equivalent portions will be given the same reference signs. Duplicated description of the portions will be simplified or omitted.

First Embodiment

FIG. 1 is a block diagram showing a building management system in a first embodiment.

As shown in FIG. 1, a building management system 1 is provided with a plurality of communication terminal apparatuses 2, a communication network 3 and a center apparatus 10. For example, the building management system 1 is provided in a building not shown.

For example, each of the plurality of communication terminal apparatuses 2 is provided in a building not shown. Each of the plurality of communication terminal apparatuses 2 control a plurality of facilities provided in the building, respectively. For example, one of the plurality of communication terminal apparatuses 2 controls a plurality of illumination facilities provided in the building. For example, one of the plurality of communication terminal apparatuses 2 controls a plurality of air-conditioning facilities provided in the building.

When one of the plurality of communication terminal apparatuses 2 detects an anomaly, the communication terminal apparatus 2 that has detected the anomaly creates anomaly information. The anomaly information includes information identifying the communication terminal apparatus 2 that has detected the anomaly and information about content of the anomaly.

For example, the communication network 3 is a wireless line or a wired line. The communication network 3 connects each of the plurality of communication terminal apparatuses 2 and the center apparatus 10 via telecommunication.

The center apparatus 10 is provided with a database 11, a communication control unit 12, a past communication traffic calculation unit 13, an input/output management unit 14, a remaining communication capacity calculation unit 15 and a communication traffic monitoring unit 16.

For example, the center apparatus 10 is provided in an information center not shown outside the building. For example, the center apparatus 10 is connected to an external terminal not shown by telecommunication.

The center apparatus 10 acquires anomaly information from a communication terminal apparatus 2 that has detected the anomaly. For example, when acquiring the anomaly information, the center apparatus 10 causes the anomaly information to be displayed on the external terminal. For example, the center apparatus 10 notifies an operator not shown, who exists in the information center, of the anomaly information via the external terminal. After that, for example, the operator dispatches maintenance staff to the communication terminal apparatus 2 that has detected the anomaly.

For example, the center apparatus 10 accepts information about an update program for each of the plurality of communication terminal apparatuses 2 from the operator. For example, the center apparatus 10 transmits the information about the update program to each of the plurality of corresponding communication terminal apparatuses 2.

The database 11 stores received information. The database 11 sends stored information.

The communication control unit 12 is connected to the plurality of communication terminal apparatuses 2 by telecommunication via the communication network 3.

The communication control unit 12 acquires anomaly information from the plurality of communication terminal apparatuses 2. When acquiring anomaly information, the communication control unit 12 causes the anomaly information to be stored into the database 11.

When receiving first transmitted information, the communication control unit 12 sends the first transmitted information to a corresponding communication terminal apparatus 2.

The past communication traffic calculation unit 13 acquires anomaly information from the communication control unit 12. The past communication traffic calculation unit 13 detects a communication terminal apparatus 2 that has detected the anomaly and communication traffic of the anomaly information, by using the anomaly information. For example, the unit of the communication traffic of anomaly information is packet. For example, the unit of communication traffic of anomaly information is byte. For example, communication traffic required to transmit anomaly information is equal to the information amount of the anomaly information.

The past communication traffic calculation unit 13 calculates past communication traffic of the communication terminal apparatus 2 that has detected the anomaly, by using information about the communication terminal apparatus 2 that has detected the anomaly and the communication traffic of the anomaly information. The past communication traffic is an accumulative value of communication traffic of anomaly information received by the center apparatus 10. The past communication traffic calculation unit 13 causes information about the past communication traffic to be stored into the database 11.

The past communication traffic calculation unit 13 calculates past communication traffic corresponding to each of the plurality of communication terminal apparatuses 2. For example, each time acquiring anomaly information, the past communication traffic calculation unit 13 calculates corresponding past communication traffic. For example, each time acquiring anomaly information, the past communication traffic calculation unit 13 causes calculated past communication traffic to be stored into the database 11.

For example, the past communication traffic calculation unit 13 clears the value of the past communication traffic to zero every specified cycle. For example, the past communication traffic calculation unit 13 causes information in which the value of the past communication traffic corresponding to each of the plurality of communication terminal apparatuses 2 is set to 0 to be stored into the database 11 every month.

For example, the input/output management unit 14 is connected to the external terminal not shown by telecommunication.

The input/output management unit 14 acquires anomaly information from the database 11. The input/output management unit 14 causes the anomaly information to be displayed on the external terminal.

The input/output management unit 14 accepts input of first transmitted information, which is information about an update program for each of the plurality of communication terminal apparatuses 2, from the external terminal. The input/output management unit 14 causes the first transmitted information to be stored into the database 11.

The first transmitted information includes information about the update program, information about whether transmission is required or not, and information about priority. For example, the information about whether transmission is required or not is any of "required" or "not required". For example, the priority is any one of "low", "medium" and "high". For example, when the update program is a program to correct a minor malfunction that rarely occurs, the priority is set to "low". For example, when the update program is a program to correct a serious malfunction, the priority is set to "high".

The input/output management unit 14 accepts input of a first communication traffic threshold from the external terminal. The input/output management unit 14 causes information about the first communication traffic threshold to be stored into the database 11.

The first communication traffic threshold is a threshold for communication traffic between each of the plurality of communication terminal apparatuses 2 and the center apparatus 10. For example, the first communication traffic threshold is an upper limit value of total communication traffic for one month for communication between each of the plurality of communication terminal apparatuses 2 and the center apparatus 10. For example, the first communication traffic threshold is the value of the total communication traffic for one month up to which each of the plurality of communication terminal apparatuses 2 and the center apparatus 10 can perform communication without paying additional charges.

The remaining communication capacity calculation unit 15 acquires, for any one of the plurality of communication terminal apparatuses 2, information about past communication traffic, information about a first communication traffic threshold and first transmitted information from the database 11. The remaining communication capacity calculation unit 15 calculates a remaining communication capacity of the one of the plurality of communication terminal apparatuses 2 by using the information about the past communication traffic, the information about the first communication traffic threshold and the first transmitted information. The remaining communication capacity calculation unit 15 causes information about the remaining communication capacity to be stored into the database 11.

For example, the remaining communication capacity calculation unit 15 calculates the remaining communication capacity for each specified period. For example, the remaining communication capacity calculation unit 15 calculates the remaining communication capacity of each of the plurality of communication terminal apparatuses 2 every month.

The remaining communication capacity calculation unit 15 acquires information about priority from the first transmitted information. For example, the remaining communication capacity calculation unit 15 determines which of "low", "medium" and "high" the priority of the first transmitted information is.

For the one of the plurality of communication terminal apparatuses 2, the remaining communication capacity calculation unit 15 calculates a second communication traffic threshold by using the information about priority and the information about the first communication traffic threshold.

If the priority is "low", the remaining communication capacity calculation unit 15 sets a value equal to the first communication traffic threshold as the second communication traffic threshold.

If the priority is "medium", the remaining communication capacity calculation unit 15 sets a value obtained by adding the value of excess traffic to the first communication traffic threshold, as the second communication traffic threshold. The excess traffic is a value obtained by multiplying the first communication traffic threshold and an excess rate set in advance together. For example, the excess rate is set as 20%. For example, if the first communication traffic threshold is 100, and the excess rate is 20%, then the excess traffic is 20. In this case, the second communication traffic threshold is 120.

If the priority is "high", the remaining communication capacity calculation unit 15 sets a value obtained by adding the past communication traffic and the information amount of the first transmitted information, as the second communication traffic threshold.

The remaining communication capacity calculation unit 15 sets a difference between the second communication traffic threshold and the value of the past communication traffic as the remaining communication capacity.

The communication traffic monitoring unit 16 acquires, for any one of the plurality of communication terminal apparatuses 2, first transmitted information and information about a remaining communication capacity from the database 11. The communication traffic monitoring unit 16 acquires information about whether transmission is required or not, from the first transmitted information.

If the information about whether transmission is required or not is "required", the communication traffic monitoring unit 16 divides the first transmitted information to create second transmitted information. The communication traffic monitoring unit 16 creates the second transmitted information with an information amount equal to or smaller than the remaining communication capacity. For example, the communication traffic monitoring unit 16 creates second transmitted information with an information amount equal to the remaining communication capacity.

For example, the communication traffic monitoring unit 16 adds information indicating content divided as the second transmitted information to pre-division first transmitted information to create post-division first transmitted information.

The communication traffic monitoring unit 16 determines whether or not there is content not divided as the second transmitted information, in the post-division first transmitted information. If there is not content not divided as the second transmitted information in the post-division first transmitted information, the communication traffic monitoring unit 16 changes the information about whether transmission of the first transmitted information is required or not to "not required". If there is content not divided as the second transmitted information in the post-division first transmitted information, the communication traffic monitoring unit 16 changes the information amount of the first transmitted information to an amount equal to the information amount of the content not divided as the second transmitted information.

For example, the communication traffic monitoring unit 16 creates second transmitted information for each specified period. For example, the communication traffic monitoring unit 16 creates second transmitted information for each of the plurality of communication terminal apparatuses 2 every month.

The communication traffic monitoring unit 16 transmits the second transmitted information to the corresponding communication terminal apparatus 2.

The communication traffic monitoring unit 16 causes the first transmitted information after division to be stored into the database 11.

Next, the division transmission processing of the center apparatus 10 will be specifically described with reference to FIG. 2.

FIG. 2 is a diagram showing an example of division transmission processing of the building management system in the first embodiment.

As shown in FIG. 2, the building management system 1 is provided with communication terminal apparatuses 2*a*, 2*b* and 2*c*.

For example, for all the communication terminal apparatuses 2, the first communication traffic threshold for one month is 100.

For example, first transmitted information "a" is first transmitted information corresponding to the communication terminal apparatus 2*a*. First transmitted information "b" is first transmitted information corresponding to the communication terminal apparatus 2*b*. First transmitted information "c" is first transmitted information corresponding to the communication terminal apparatus 2*c*.

For example, in a state in which the information about whether transmission is required or not is "required" for all the pieces of first transmitted information, the input/output management unit 14 causes all the pieces of first transmitted information to be stored into the database 11.

For example, the information amount of all the pieces of first transmitted information is 150.

For example, the priority of the first transmitted information "a" is "low". For example, the priority of the first transmitted information "b" is "medium". For example, the excess rate of the first transmitted information "b" is 20%. For example, the priority of the first transmitted information "c" is "high".

For example, the center apparatus 10 performs division transmission processing for April for the communication terminal apparatus 2*a* on April 30. For example, for a period from April 1 to 29, the past communication traffic of the communication terminal apparatus 2*a* is 30. The remaining communication capacity calculation unit 15 sets the second communication traffic threshold to 100. The remaining communication capacity calculation unit 15 sets the remaining communication capacity to 70 by calculating a difference between the value of the past communication traffic and the second communication traffic threshold. The communication traffic monitoring unit 16 divides the first transmitted information "a" to create second transmitted information "a". The information amount of the second transmitted information "a" is 70. The communication traffic monitoring unit 16 changes the information amount of the first transmitted information "a" to 80, which is the amount of information not divided as the second transmitted information. The communication traffic monitoring unit 16 transmits the second transmitted information "a" to the communication terminal apparatus 2a. The center apparatus 10 ends the division transmission processing.

After that, for example, the center apparatus 10 performs division transmission processing for May for the communication terminal apparatus 2a on May 31. For example, for a period from May 1 to 30, the past communication traffic of the communication terminal apparatus 2a is 10. The remaining communication capacity calculation unit 15 sets the second communication traffic threshold to 100. The remaining communication capacity calculation unit 15 sets the remaining communication capacity to 90 by calculating a difference between the value of the past communication traffic and the second communication traffic threshold. The communication traffic monitoring unit 16 divides the first transmitted information "a" to create second transmitted information "a". The information amount of the second transmitted information "a" is 80. The communication traffic monitoring unit 16 changes the information amount of the first transmitted information "a" to 0, which is the amount of information not divided as the second transmitted information. The communication traffic monitoring unit 16 changes the information about whether transmission of the first transmitted information "a" is required or not to "not required". The communication traffic monitoring unit 16 transmits the second transmitted information "a" to the communication terminal apparatus 2a. The center apparatus 10 ends the division transmission processing.

For example, the center apparatus 10 performs division transmission processing for April for the communication terminal apparatus 2b on April 30. For example, for a period from April 1 to 29, the past communication traffic of the communication terminal apparatus 2b is 60. The remaining communication capacity calculation unit 15 sets the second communication traffic threshold to 120 by calculating excess traffic. The remaining communication capacity calculation unit 15 sets the remaining communication capacity to 60 by calculating a difference between the value of the past communication traffic and the second communication traffic threshold. The communication traffic monitoring unit 16 divides the first transmitted information "b" to create second transmitted information "b". The information amount of the second transmitted information "b" is 60. The communication traffic monitoring unit 16 changes the information amount of the first transmitted information "b" to 90, which is the amount of information not divided as the second transmitted information. The communication traffic monitoring unit 16 transmits the second transmitted information "b" to the communication terminal apparatus 2b. The center apparatus 10 ends the division transmission processing.

After that, for example, the center apparatus 10 performs division transmission processing for May for the communication terminal apparatus 2b on May 31. For example, for a period from May 1 to 30, the past communication traffic of the communication terminal apparatus 2b is 30. The remaining communication capacity calculation unit 15 sets the second communication traffic threshold to 120 by calculating excess traffic. The remaining communication capacity calculation unit 15 sets the remaining communication capacity to 90 by calculating a difference between the value of the past communication traffic and the second communication traffic threshold. The communication traffic monitoring unit 16 divides the first transmitted information "b" to create second transmitted information "b". The information amount of the second transmitted information "b" is 90. The communication traffic monitoring unit 16 changes the information amount of the first transmitted information "b" to 0, which is the amount of information not divided as the second transmitted information. The communication traffic monitoring unit 16 changes the information about whether transmission of the first transmitted information "b" is required or not to "not required". The communication traffic monitoring unit 16 transmits the second transmitted information "b" to the communication terminal apparatus 2b. The center apparatus 10 ends the division transmission processing.

For example, the center apparatus 10 performs division transmission processing for April for the communication terminal apparatus 2c on April 30. For example, for a period from April 1 to 29, the past communication traffic of the communication terminal apparatus 2c is 60. The remaining communication capacity calculation unit 15 calculates a sum of the value of the information amount of the first transmitted information and the value of the past communication traffic to set the second communication traffic threshold to 210. The remaining communication capacity calculation unit 15 sets the remaining communication capacity to 150 by calculating a difference between the value of the past communication traffic and the second communication traffic threshold. The communication traffic monitoring unit 16 divides the first transmitted information "c" to create second transmitted information c. The information amount of the second transmitted information "c" is 150. The communication traffic monitoring unit 16 changes the information amount of the first transmitted information "c" to 0, which is the amount of information not divided as the second transmitted information. The communication traffic monitoring unit 16 changes the information about whether transmission of the first transmitted information "c" is required or not to "not required". The communication traffic monitoring unit 16 transmits the second transmitted information "c" to the communication terminal apparatus 2c. The center apparatus 10 ends the division transmission processing.

After that, for example, the center apparatus 10 performs division transmission processing for May for the communication terminal apparatus 2c on May 31. The communication traffic monitoring unit 16 determines that the information about whether transmission of the first transmitted information "c" is required or not is "not required". The center apparatus 10 ends the division transmission processing.

Next, the division transmission processing performed by the center apparatus 10 will be described with reference to FIG. 3.

FIG. 3 is a flowchart of the division transmission processing performed by a center apparatus of the building management system in the first embodiment.

The flowchart shown in FIG. 3 indicates division transmission processing corresponding to one of the plurality of communication terminal apparatuses 2.

As shown in FIG. 3, at step S001, the communication traffic monitoring unit 16 determines whether information about whether transmission of first transmitted information is required or not is "required" or not.

If the information about whether transmission of the first transmitted information is required or not is "required" at step S001, operation of step S002 is performed. At step S002, the remaining communication capacity calculation unit 15 determines which of "low", "medium" and "high" the priority of the first transmitted information is.

If the priority of the first transmitted information is "low" at step S002, operation of step S003 is performed. At step S003, the remaining communication capacity calculation unit 15 sets a value equal to a first communication traffic threshold as a second communication traffic threshold. The remaining communication capacity calculation unit 15 sets a difference between the second communication traffic threshold and the value of past communication traffic as a remaining communication capacity. The remaining communication capacity calculation unit 15 causes the remaining communication capacity to be stored into the database 11.

After that, operation of step S004 is performed. The communication traffic monitoring unit 16 creates second transmitted information. The communication traffic monitoring unit 16 transmits the second transmitted information to the corresponding communication terminal apparatus 2.

After that, operation of step S005 is performed. The communication traffic monitoring unit 16 determines whether or not there is content not divided as the second transmitted information, in the post-division first transmitted information.

If there is not content that is divided as the second transmitted information in the post-division first transmitted information, at step S005, operation of step S006 is performed. At step S006, the communication traffic monitoring unit 16 changes the information about whether transmission of the first transmitted information is required or not to "not required".

After that, the center apparatus 10 ends the processing.

If there is content not divided as the second transmitted information in the post-division first transmitted information, at step S005, operation of step S007 is performed. At step S007, the communication traffic monitoring unit 16 changes the information amount of the first transmitted information to the same value as the information amount of the content not divided as the second transmitted information.

After that, the center apparatus 10 ends the processing.

If the priority of the first transmitted information is "medium" at step S002, operation of step S008 is performed. At step S008, the remaining communication capacity calculation unit 15 sets a value obtained by adding excess traffic to the first communication traffic threshold as the second communication traffic threshold. The remaining communication capacity calculation unit 15 sets a difference between the second communication traffic threshold and the value of the past communication traffic as the remaining communication capacity. The remaining communication capacity calculation unit 15 causes the remaining communication capacity to be stored into the database 11.

After that, operation after step S004 is performed.

If the priority of the first transmitted information is "high" at step S002, operation of step S009 is performed. At step S009, the remaining communication capacity calculation unit 15 sets a sum of the value of the past communication traffic and the value of the information amount of the first transmitted information, as the second communication traffic threshold. The remaining communication capacity calculation unit 15 sets a difference between the second communication traffic threshold and the value of the past communication traffic as the remaining communication capacity. The remaining communication capacity calculation unit 15 causes the remaining communication capacity to be stored into the database 11.

After that, operation of step S010 is performed. The communication traffic monitoring unit 16 creates second transmitted information. The communication traffic monitoring unit 16 transmits the second transmitted information to the corresponding communication terminal apparatus 2.

After that, operation after step S006 is performed.

If the information about whether transmission of the first transmitted information is required or not is not "required" at step S001, the center apparatus 10 ends the processing.

According to the first embodiment described above, the building management system 1 is provided with the communication terminal apparatuses 2 provided in a building and the center apparatus 10. The center apparatus 10 is provided with the past communication traffic calculation unit 13, the remaining communication capacity calculation unit 15 and the communication traffic monitoring unit 16. The past communication traffic calculation unit 13 calculates past communication traffic which is an accumulative value of traffic of communication received from a communication terminal apparatus 2. The past communication traffic calculation unit 13 calculates a remaining communication capacity by using information about a first communication traffic threshold set by an operator and information about the past communication traffic. If communication traffic required for transmission of first transmitted information is larger than the remaining communication capacity, the communication traffic monitoring unit 16 creates second transmitted information by dividing the first transmitted information. Communication traffic to transmit the second transmitted information does not exceed the remaining communication capacity. After that, the communication traffic monitoring unit 16 transmits the second transmitted information to the corresponding communication terminal apparatus 2. Therefore, the building management system 1 can prevent total communication traffic between the center apparatus 10 and the communication terminal apparatus 2 from exceeding a set threshold.

For example, the remaining communication capacity calculation unit 15 calculates the remaining communication capacity every specified cycle. The communication traffic monitoring unit 16 creates second transmitted information every specified cycle until all the first transmitted information is transmitted to the communication terminal apparatus 2. Therefore, the building management system 1 can transmit all the first transmitted information to the communication terminal apparatus 2 without exceeding total communication traffic determined for each specified cycle. As a result, the communication terminal apparatus 2 can receive all the information about an update program.

Further, the communication traffic monitoring unit 16 determines whether or not to create second transmitted information by using transmission request information that first transmitted information is provided with. As a result, the center apparatus 10 can prevent an unnecessary processing operation from being executed.

Further, the remaining communication capacity calculation unit 15 calculates a second communication traffic threshold having a value equal to the first communication traffic threshold. The remaining communication capacity calculation unit 15 sets a value obtained by subtracting the value of the past communication traffic from the second communication traffic threshold as the remaining communication capacity. Therefore, the center apparatus 10 can create the second transmitted information with an information amount that does not exceed the total communication traffic set in advance.

Further, the remaining communication capacity calculation unit 15 calculates a second communication traffic threshold with a value equal to a sum of excess traffic, which is a value obtained by multiplying the first communication traffic threshold by a set excess rate, and the first communication traffic threshold. The remaining communication capacity calculation unit 15 sets a value obtained by subtracting the value of the past communication traffic from the second communication traffic threshold as the remaining communication capacity. Therefore, the building management system 1 can equalize excess communication traffics in a plurality of specified periods. As a result, the building management system 1 can control excess of running costs for each predetermined period to be within a range of the excess rate.

Further, the remaining communication capacity calculation unit 15 calculates a second communication traffic threshold with a value equal to a sum of the value of the information amount of the first transmitted information and the value of the past communication traffic. The remaining communication capacity calculation unit 15 sets a value obtained by subtracting the value of the past communication traffic from the second communication traffic threshold as the remaining communication capacity. Therefore, the building management system 1 can transmit the first transmitted information to the communication terminal apparatus 2 regardless of whether total communication traffic is excessive or not. As a result, the building management system 1 can promptly transmit an important update program to the communication terminal apparatus 2.

Further, the remaining communication capacity calculation unit 15 selects a method for calculating the second communication traffic threshold by using information about priority of the first transmitted information. Therefore, the building management system 1 can control the excess communication traffic in consideration of importance of the first transmitted information. As a result, the building management system 1 can adjust costs required for management of the building.

Note that, the number of communication terminal apparatuses 2 provided for the building management system 1 may be any number. For example, the building management system 1 is provided with one communication terminal apparatus 2.

Note that, if it is possible to set such a second communication traffic threshold that the information amount of first transmitted information and the information amount of second transmitted information are the same when priority of the first transmitted information is "high", the method for the remaining communication capacity calculation unit 15 to calculate the second communication traffic threshold is not limited to the above method. For example, when priority of first transmitted information is "high", the remaining communication capacity calculation unit 15 sets a value equal to a sum of the first communication traffic threshold and the value of the information amount of the first transmitted information as the second communication traffic threshold.

Next, for the division transmission processing of the center apparatus 10, description will be made on a comparative example in which monthly total communication traffic does not exceed a set value.

FIG. 4 is a diagram showing a comparative example of the division transmission processing of the building management system in the first embodiment.

As shown in FIG. 4, the building management system 1 is provided with communication terminal apparatuses 2*d* and 2*e*.

For example, for all the communication terminal apparatuses 2, the first communication traffic threshold for one month is 100.

For example, the input/output management unit 14 causes all the pieces of first transmitted information to be stored into the database 11 in a state in which the information about whether transmission is required or not is "required" for all the pieces of first transmitted information.

For example, the information amount of all the pieces of first transmitted information is 150.

For example, first transmitted information "d" is first transmitted information corresponding to the communication terminal apparatus 2*d*. First transmitted information "e" is first transmitted information corresponding to the communication terminal apparatus 2*e*.

In the comparative example, none of the pieces of first transmitted information is provided with information about priority. In the comparative example, the remaining communication capacity calculation unit 15 performs the same operation as the case where priority is "low".

For example, the center apparatus 10 performs division transmission processing for April for the communication terminal apparatus 2*d* on April 30. For example, for the period from April 1 to 29, the past communication traffic of the communication terminal apparatus 2*d* is 40. The remaining communication capacity calculation unit 15 sets the second communication traffic threshold to 100. The remaining communication capacity calculation unit 15 sets the remaining communication capacity to 60 by calculating a difference between the value of the past communication traffic and the second communication traffic threshold. The communication traffic monitoring unit 16 divides the first transmitted information "d" to create second transmitted information "d". The information amount of the second transmitted information "d" is 60. The communication traffic monitoring unit 16 changes the information amount of the first transmitted information "d" to 90. The communication traffic monitoring unit 16 transmits the second transmitted information "d" to the communication terminal apparatus 2*d*. The center apparatus 10 ends the division transmission processing.

After that, the center apparatus 10 performs division transmission processing for May for the communication terminal apparatus 2*d* on May 31. For example, for the period from May 1 to 30, the past communication traffic of the communication terminal apparatus 2*d* is 30. The remaining communication capacity calculation unit 15 sets the second communication traffic threshold to 100. The remaining communication capacity calculation unit 15 sets the remaining communication capacity to 70. The communication traffic monitoring unit 16 creates second transmitted information "d" with an information amount of 70. The communication traffic monitoring unit 16 changes the information amount of the first transmitted information "d" to 20. The communication traffic monitoring unit 16 transmits the second transmitted information "d" to the communication terminal apparatus 2*d*. The center apparatus 10 ends the division transmission processing.

After that, the center apparatus 10 performs division transmission processing for June for the communication terminal apparatus 2*d* on June 30. For example, for a period from June 1 to 29, the past communication traffic of the communication terminal apparatus 2*d* is 10. The remaining communication capacity calculation unit 15 sets the second communication traffic threshold to 100. The remaining communication capacity calculation unit 15 sets the remaining communication capacity to 90. The communication traffic monitoring unit 16 creates second transmitted information "d" with an information amount of 20. The communication traffic monitoring unit 16 changes the information amount of the first transmitted information "d" to 0. The communication traffic monitoring unit 16 transmits the second transmitted information "d" to the communication terminal apparatus 2d. The communication traffic monitoring unit 16 changes the information about whether transmission of the first transmitted information "d" is required or not to "not required". The center apparatus 10 ends the division transmission processing.

Division transmission processing that the center apparatus 10 performs for the first transmitted information "e" is performed similarly to the division transmission processing for the first transmitted information "d".

Next, an example of a hardware configuration of the center apparatus 10 will be described with reference to FIG. 5.

Figure 5:
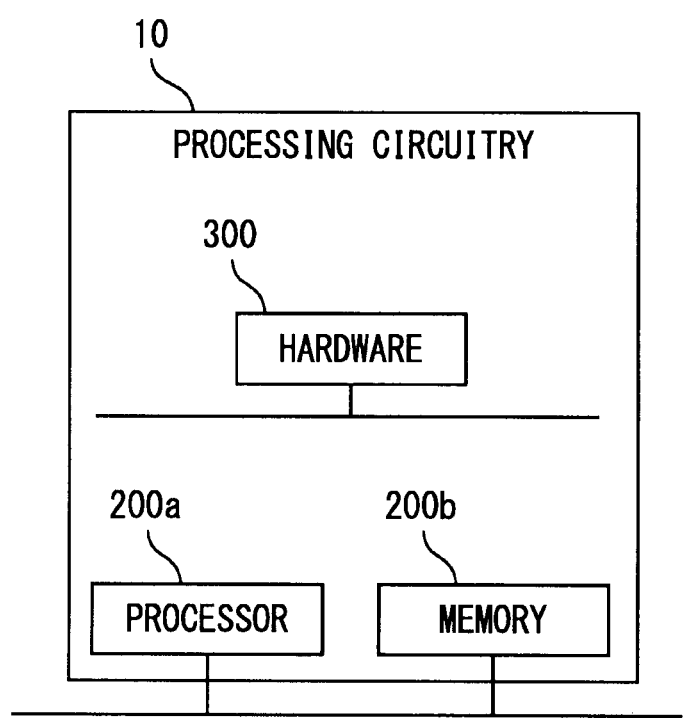
FIG. 5 is a hardware configuration diagram of the center apparatus of the building management system in the first embodiment.

FIG. 5 is a hardware configuration diagram of the center apparatus of the building management system in the first embodiment.

Each function of the center apparatus 10 can be realized by processing circuitry. For example, the processing circuitry is provided with at least one processor 200a and at least one memory 200b. For example, the processing circuitry is provided with at least one piece of dedicated hardware 300.

When the processing circuitry is provided with at least one processor 200a and at least one memory 200b, each function of the center apparatus 10 is realized by software, firmware or combination of software and firmware. At least either the software or the firmware is written as a program. At least either the software or the firmware is stored in the at least one memory 200b. The at least one processor 200a realizes each function of the center apparatus 10 by reading and executing the program stored in the at least one memory 200b. The at least one processor 200a is also referred to as a central processing unit, a processing device, an arithmetic device, a microprocessor, a microcomputer or a DSP. For example, the at least one memory 200b is a non-volatile or volatile semiconductor memory such as a RAM, a ROM, a flash memory, an EPROM or an EEPROM, a magnetic disk, a flexible disk, an optical disc, a compact disc, a mini disc, a DVD or the like.

When the processing circuitry is provided with the at least one dedicated hardware 300, the processing circuitry is realized, for example, by a single circuit, a composite circuit, a programmed processor, a parallel-programmed processor, an ASIC, an FPGA or a combination thereof. For example, the functions of the center apparatus 10 are realized by processing circuits, respectively. For example, the functions of the center apparatus 10 are collectively realized by processing circuitry.

Some of the functions of the center apparatus 10 may be realized by the dedicated hardware 300, and the other may be realized by software or firmware. For example, functions of the communication control unit 12 may be realized by processing circuitry as the dedicated hardware 300, and functions other than the functions of the communication control unit 12 may be realized by the at least one processor 200a reading and executing the program stored in the at least one memory 200b.

Thus, the processing circuitry realizes each function of the center apparatus 10 by the hardware 300, software, firmware or combination thereof.

Each function of each of the plurality of communication terminal apparatuses 2 is also realized by processing circuitry equal to the processing circuitry realizing each function of the center apparatus 10.

INDUSTRIAL APPLICABILITY

As described above, the building management system according to the present disclosure can be used for a communication management system provided in a building.

REFERENCE SIGNS LIST

1 Building management system
2 Communication terminal apparatus
3 Communication network
10 Center apparatus
11 Database
12 Communication control unit
13 Past communication traffic calculation unit
14 Input/output management unit
15 Remaining communication capacity calculation unit
16 Communication traffic monitoring unit
200a Processor
200b Memory
300 Hardware

The invention claimed is:

1. A building management system comprising a center apparatus, the center apparatus comprising:
   circuitry
   to calculate past communication traffic which is an accumulative value of traffic of communication received from a communication terminal apparatus provided in a building;
   to calculate a remaining communication capacity by using information about a set first communication traffic threshold and information about the past communication traffic; and
   to create, if communication traffic required for transmission of first transmitted information to be transmitted to the communication terminal apparatus is larger than the remaining communication capacity, such second transmitted information that communication traffic required for transmission does not exceed the remaining communication capacity by dividing the first transmitted information, and to transmit the second transmitted information to the communication terminal apparatus.

2. The building management system according to claim 1, wherein
   the circuitry is configured
   to calculate the remaining communication capacity every specified cycle; and
   to create the second transmitted information every specified cycle until all the first transmitted information is transmitted to the communication terminal apparatus.

3. The building management system according to claim 1, wherein
   the circuitry is configured
   to determine whether or not to create the second transmitted information by using information about whether transmission is required or not, the information being provided in the first transmitted information.

4. The building management system according to claim 1, wherein
   the circuitry is configured
   to calculate a second communication traffic threshold with a value equal to the first communication traffic threshold, and to set a value obtained by subtracting a value of the past communication traffic from the second communication traffic threshold as the remaining communication capacity.

5. The building management system according to claim 1, wherein
the circuitry is configured
to calculate a second communication traffic threshold with a value equal to a sum of excess traffic, which is a value obtained by multiplying the first communication traffic threshold by a set excess rate, and the first communication traffic threshold, and to set a value obtained by subtracting a value of the past communication traffic from the second communication traffic threshold as the remaining communication capacity.

6. The building management system according to claim 1, wherein
the circuitry is configured
to calculate a second communication traffic threshold with a value equal to a sum of a value of an information amount of the first transmitted information and a value of the past communication traffic, and to set a value obtained by subtracting the value of the past communication traffic from the second communication traffic threshold as the remaining communication capacity.

7. The building management system according to claim 4, wherein
the circuitry is configured
to select a method for calculating the second communication traffic threshold by using information about priority set for the first transmitted information.

8. The building management system according to claim 5, wherein
the circuitry is configured
to select a method for calculating the second communication traffic threshold by using information about priority set for the first transmitted information.

9. The building management system according to claim 6, wherein
the circuitry is configured
to select a method for calculating the second communication traffic threshold by using information about priority set for the first transmitted information.

\* \* \* \* \*